United States Patent Office 2,796,345
Patented June 18, 1957

2,796,345

PROCESS OF PRODUCING LEAD-ZINC ALLOYS

Samuel Freedman, La Mesa, Calif., assignor to Sightmaster of California Company, Inc., Santee, Calif., a corporation of California, now by change of name to Chemalloy-Electronics Corp., a corporation of California No Drawing. Application March 31, 1952,
Serial No. 279,696

2 Claims. (Cl. 75—166)

This invention relates to welding or soldering alloys and to processes of making such alloys.

One object of this invention is to provide a welding or soldering alloy which can be used to unite metal parts including aluminum parts, without the necessity of employing careful cleaning procedure or fluxes, and without the necessity of employing the drastic cleaning measures or using the corrosive fluxes or specialized equipment previously required with aluminum welding or soldering processes in order to remove the tenacious oxide film from the surface of the aluminum.

Another object is to provide a welding or soldering alloy for uniting metal parts, including aluminum or aluminum alloy parts, which alloy is easily and quickly employed by merely bringing the aluminum or aluminum alloy parts together, heating them at their proposed junction by any suitable means such as a gas torch in order to raise them above the melting point of the welding alloy, and then stroking the parts at their junction by passing a rod of the alloy back and forth along their junction, whereupon the welding rod melts and flows by capillary attraction into and along the junction without previously applying a flux, uniting the parts tenaciously in a firm and permanent joint.

Another object is to provide a welding or soldering alloy for uniting metal parts, including aluminum or aluminum alloy parts, wherein the welded area, after welding or soldering, has a strength at the junction which is greater than the strength of the adjacent metal, so that if the parts are subjected to excessive force, they will break adjacent the junction, but not at the junction itself, even if the welding alloy has approximately the same thickness at the junction as the thickness of the adjoining aluminum or aluminum alloy parts which have been welded.

Another object is to provide a welding or soldering alloy for uniting metal parts, including aluminum or aluminum alloy parts, which alloy has a silvery appearance at the welded junction and which will not rust or corrode, and which can be readily machined, polished, plated or painted.

Another object is to provide a welding or soldering alloy for uniting metal parts, including aluminum or aluminum alloy parts, which alloy can be employed by inexperienced persons without special training and without the need for any of the special preparatory measures previously required in uniting aluminum parts, and not requiring welding hoods, colored glasses or special eye protection.

Another object is to provide a welding or soldering alloy for uniting metal parts, including aluminum or aluminum alloy parts, wherein the welded area has a very fine grain structure without porosity, and wherein soft solder will adhere so as to enable the attachment of wires to aluminum or aluminum alloy parts by soldering the wires to the welding metal.

Another object is to provide a welding or soldering alloy for uniting metal parts, including aluminum or aluminum alloy parts, wherein special grooving or other special preparation of the edges of the aluminum parts to be united is not necessary, because the welding alloy of the present invention penetrates through the oxide film to the interior of the metal to make a strong fusion, and flows readily without spattering or creating lumps, and without the production of the fumes or odors produced when fluxes are used as in prior processes of uniting aluminum or aluminum alloy parts.

Another object is to provide a process of making a welding or soldering alloy having the characteristics set forth in the preceding objects, wherein the process enables the introduction of chemicals into the alloy while it is in a molten state, without the production of dangerous explosions which have hitherto characterized the attempted mixing of such chemicals with molten metal, these chemicals giving the alloy its properties of penetrating through oxide layers or coatings of impurities and of flowing easily and naturally by capillary attraction into the junction between the parts to be united.

Another object is to provide a process of making a welding or soldering alloy of the foregoing character wherein the chemicals are introduced into the molten alloy by being minutely subdivided into particles which are separated from one another by inert material, such as by mixing the chemicals into porous slag or other porous material which will act similarly, thereby producing a myriad of separated minute explosions instead of a single large one.

Another object is to provide a process of making a welding or soldering alloy, as set forth in the object immediately above, wherein the danger of explosion in introducing the chemicals into the molten alloy is further reduced by the use of a layer of carbon, such as fine grain charcoal forming an insulating blanket, over the top of the molten alloy, the porous material containing the chemicals being placed upon this carbon layer and pushed through it into the molten alloy beneath it, the slag, after being freed from its chemicals, floating to the surface where it is skimmed off.

Hitherto, the welding or soldering of aluminum has been a difficult procedure requiring specialized knowledge, skilled workmanship, and careful preparation of the aluminum or aluminum alloy parts to be welded. The tenacious film of oxide which adheres to the surface of aluminum or aluminum alloys, unless removed by careful preparation or by the use of corrosive fluxes, effectively prevented the obtaining of a strong welded junction between the parts being united. Furthermore, the fact that aluminum melts suddenly at 1217° F. without any advance indication, such as discoloration, of nearing the melting point, has made high temperature welding procedures dangerous, due to the possibility of destroying the parts themselves by their sudden disintegration. The corrosive fluxes hitherto used have also caused the creation of annoying fumes and odors, and protective goggles, hoods or the like have been required because of the danger to the eyes of the welding material spattering or sputtering. Nevertheless, without first applying a flux to create a flow path, the welding or soldering alloy would not flow along or into the junction of the parts to be united. The welding alloy of the present invention, as made by the process of the present invention, eliminates these defects and accomplishes the new results and advantages set forth in the above-stated objects.

In preparing the alloy of the present invention, the following metals and metal alloys are melted together in a crucible in the following proportions to provide the metallic ingredients:

|   | Pounds |
|---|---|
| Yellow brass (30% zinc and 70% copper) | 8 |
| Aluminum | 8 |
| 40–60 solder (40% tin and 60% lead) | 1.5 |
| Silver (.1%) or | .1 |
| Nickel (.1%) | .1 |
| Zinc, to make up a 100 pound batch or | 82.3 |
|   | 100.0 |

The chemical ingredients are next prepared in approximately the following proportions, for a 100 pound batch of the above metal ingredients:

| | | |
|---|---|---|
| Powdered copper slag | pounds | 3.0 |
| Yellow sulphur | do | 1.25 |
| Willow charcoal | do | 0.75 |
| Commercial muriatic acid (hydrochloric acid) | gallons | 0.50 |

The chemical ingredients are mixed together thoroughly and the acid added and stirred into the dry ingredients until a thin or watery paste-like mass is produced.

Meanwhile, the metal ingredients in the crucible have been heated until they reach the temperature of approximately 1450° F. and a layer of fine grain powdered charcoal of approximately a half-inch thickness is deposited on top of the molten metal to form an insulating blanket. When this charcoal layer has become red in color, the wet mass of chemical ingredients is deposited entirely over the top of the charcoal blanket in a thick layer. Using a suitable pushing device, such as a metal rod, the chemical mass is forced down through the charcoal blanket into the molten metal mixture, a small area at a time. The charcoal blanket shields the remainder of the mass from explosion or excessive reaction. As the chemical mass is pushed into the molten metal mixture in the crucible, a multitude of tiny reactions occurs throughout it, instead of a single large explosion, due to the fact that the chemical particles are separated from one another by the porous inert slag and by the particles of charcoal. As each portion which has been pushed down into the molten metal mixture is absorbed into the latter, another portion is pushed down and so on, until each portion of the chemical mass or layer has been pushed through the insulating charcoal blanket, a small area at a time.

After all of the wet chemical mass has been pushed downward into the molten metal mixture in the crucible, the entire mixture is stirred thoroughly to release all of the chemicals from the pores of the copper slag and to cause the tiny reactions and explosions to be completed. When this has been done, and the slag has lost its chemical impregnations by these reactions and minute explosions, the slag floats to the surface of the molten metal mixture, along with other impurities or superfluous materials, these being skimmed from the surface of the molten mixture, leaving the latter in its finished state. The chemically-impregnated alloy thus formed is then poured out and formed into suitable shapes such as rods, bars or ingots.

During the period in which the chemical ingredients are being pushed downward through the charcoal blanket into the molten metal mixture, corrosive fumes are emitted which must be carefully disposed of or they will discolor paint, corrode ferrous metals, and cause annoyance to persons in the vicinity. After the alloy has been made in the above manner, however, it may be subsequently remelted without the formation of such fumes. The chemically-impregnated metal alloy remaining after the process has been completed is a finely homogenized, high quality alloy which is easily machined, plated or painted, as desired.

The present process also enables the combining of zinc and lead in an alloy, even though these metals are normally incompatible. For example, only one-half of one per cent of lead in a zinc base die, such as is used in aircraft production, causes the die to crack during use, because lead will not ordinarily mix with zinc satisfactorily.

The copper slag mentioned in the foregoing process is the waste slag produced in copper smelting plants, and is useful because of its porosity and inert characteristics. It will be obvious that other porous materials which are similarly inert may also be employed to subdivide the chemical ingredients in the above manner and thereby convert an otherwise dangerous single explosion into a multitude of tiny harmless explosions and reactions.

The chemical ingredients thus incorporated into the metal alloy impart to the alloy the capability of flowing naturally and easily by capillary attraction when the alloy is applied to the junction of metal parts, such as aluminum, to be united, without the previous use of a flux. Hitherto, it has been necessary to apply a flux in order to form a flux path at the junction of the metal parts to be united, or otherwise the welding metal does not flow well, and does not easily enter the junction between the metal parts to be united.

The proportions and, indeed, the components of the metallic mixture are not critical and many variations may be used. In place of the brass, pure copper or even bronze can be employed, more copper giving greater strength. The nickel and silver components are mere traces which produce better uniting of the metal components with one another. The chemical components of the alloy enable the alloy to penetrate the oxide film on aluminum without wire brushing or other previous preparation and to penetrate the crack or other junction between the parts to be united and to emerge on the opposite side thereof.

Proof that the chemical ingredients remain in the alloy is found in the fact that shavings of the alloy placed in a glass of ordinary tap water cause the flow of an electric current which may be detected by a voltmeter, milliammeter or cathode ray oscilloscope when leads or electrodes connected thereto are inserted in the water. Moreover, when the alloy particles or shavings have been permitted to remain in the water for several hours, gas bubbles will emerge from the water and form on the surface. Each of these bubbles explodes upon the application of a match, showing that chemicals in the alloy shavings produce hydrogen and other gases when placed in water. A still more powerful effect is obtained when salt water is used. Moreover, if the alloy is prepared in the form of a powder, this powder tends to come to the surface of the water and float thereon even though its specific gravity or weight is nearly seven times that of water.

In the use of the alloy of the invention in soldering or welding metal parts, such as aluminum, the extreme and exacting cleaning measures previously employed are unnecessary. The parts to be united, if not already satisfactorily supported adjacent one another, are placed in proximity to one another at the location where they are to be united, and heated by any suitable means, to a temperature which is sufficient to melt the alloy. A temperature of approximately 800° F. at the point of weld is sufficient, and as this is 400 to 500 degrees lower than the melting point of aluminum or aluminum alloys, there is no danger of harming the parts if ordinary care is taken. No special heating equipment is necessary, as the parts may be heated electrically, as by a hot plate, or by the application of a flame, such as from a gas torch, Bunsen burner, spirit lamp or the like.

When the parts have been so heated, a piece, such as a rod, of the alloy of the present invention is rubbed against the parts and passed to and fro along their proposed junction. Since the melting point of the welding alloy of the present invention is below 825° F., it melts and flows freely at that temperature, forming a silvery liquid resembling mercury. No flux is necessary to cause the alloy to flow, penetrate or adhere. As the rod is rubbed back and forth along the junction, the alloy melts and flows easily and naturally by capillary attraction into the junction, where it quickly solidifies. At the same time, it attacks the oxide film on the aluminum or aluminum alloy, and penetrates below that film into the metal itself, so that a strong weld is obtained. The alloy, upon cooling, has a silvery, attractive appearance which blends well with the adjacent aluminum or aluminum alloy. It also has a very fine grain structure and is substantially free from porosity.

The alloy of the present invention may be used either in soldering, brazing or welding any aluminum or zinc-base metal with a very high efficiency and also in uniting other metals or materials with varying degrees of efficiency. The welding handbook of the American Welding Society in effect states that soldering takes place below 800° F., brazing above 800° F. and welding at such higher temperatures where the parent metal itself has been disturbed and fusion has taken place.

The metal parts when united by the alloy of the present invention, may be machined by the usual techniques and equipment, as the alloy machines easily and is also easily painted or plated.

The use of the alloy of the present invention may be summarized by stating that it may be employed for (1) welding of the metal parts without fusion, namely soldering or brazing; (2) welding with fusion of the metal parts, namely use of sufficient heat to cause surface fusion of the metal parts to be united; and (3) welding with fusion of the parts to be united, accompanied by capillary action, namely welding wherein the alloy flows along the parts and through the junction thereof without the previous use of a flux.

The use of the alloy of the present invention for soldering, brazing or welding metals other than aluminum alloys, such as the zinc base metal mentioned above, is carried out in a similar manner except that the working margin of temperature between the zinc in the parts to be united and the present alloy is much smaller since aluminum melts at the relatively high temperature of 1217° F., whereas zinc melts at the relatively low temperature of 713° F. To lower the melting temperature of the alloy of the present invention, therefore, the silver and nickel should be omitted and the proportionate amount of brass reduced, as these metals contribute to raising the melting point. Experiments have also shown that the alloy of the present invention may be used to solder, braze or weld magnesium, but considerably more care and vigilance is necessary because magnesium, although melting at about 1200° F., occasionally catches fire at about 1000° F. Here also, the working margin of temperature is rather small and consequently operations must be conducted with caution.

In the process of preparing the alloy of the present invention, if the furnace heat is inadvertently raised to too high a temperature so that some of the metal ingredients start to volatilize, particularly the zinc, the operator immediately covers the top of the molten metal in the crucible with a layer of willow charcoal, which stops the volatilization. Normally, however, the operator does not use more charcoal after the layer which he initially applies, and waits until this charcoal powder has become completely red before he attempts to push the chemical ingredients downward through it into the molten metal. In practice, if the chemical ingredients are forced through the charcoal blanket prematurely, that is, before it becomes fully red, the charcoal powder will puff up in clouds of black smoke which is irritating to the lungs and soils the clothing and the surroundings. It has been found best to permit the charcoal to ignite and burn at the outer periphery of the crucible and gradually consume itself toward the center of the blanket, whereupon the flame disappears and the top of the molten metal in the crucible becomes tightly sealed with a red charcoal coating.

To improve the free machining characteristics of the alloy, the proportion of solder may be increased, the machinability increasing as the proportion of solder is increased. Thus, in the formula given above, instead of 1.5 pounds of solder for a hundred pound batch, as much as 3 to 5 pounds of solder may be beneficially employed.

Additional sulphur is employed occasionally if, for example, it is found that high melting components of the alloy are not properly melting, even though the temperature has been raised to the point where other ingredients, such as zinc, are ready to volatilize. In that instance, the operator throws yellow sulphur into the portion of the crucible where the unmelted brass is located, whereupon a blue flame arises and increases the temperature in the immediate vicinity of the sulphur, causing the brass to melt readily. Thus, the addition of sulphur has the opposite effect from the addition of charcoal in that sulphur increases the heat or fire where charcoal puts it out or minimizes it.

The muriatic acid may volatilize, to some extent, when it encounters the molten metal, but it undoubtedly reacts chemically with the metals in the crucible to produce salts such as chlorides which increase the tenacity of adhesion of the alloy in welding or soldering, and thus render the use of a separate flux unnecessary. The charcoal blanket, however, reduces the tendency of the muriatic acid to volatilize, especially if only small portions of the chemical ingredients are pushed through the charcoal layer into the molten metals at a given time. The copper slag of the formula, being inert and heat-resistant, apparently takes no part in the chemical reaction but merely serves as a vehicle or carrier or modulator in a manner analogous to the phenomenon of modulation in radio wave transmission. Thus, the alloy of the present invention is characterized by the presence of chemicals in solution with the metals, these chemicals remaining in the alloy upon solidification and enhancing the flow of the alloy by capillary action during welding without the use of a separate flux.

The use of the alloy of the present invention enables aluminum to be substituted for critically scarce copper in many installations or applications where aluminum was previously considered unsatisfactory because of the difficulty of welding or soldering it. The present alloy may also be used to coat aluminum wire by a procedure analogous to "tinning" copper wire so that the thus coated aluminum may be soft-soldered to other metals. The present alloy may also be used in the form of a molten bath for "tinning" aluminum articles for soldering them or for hermetically sealing them.

What I claim is:

1. The process of producing an alloy including zinc and lead having increased homogeneity suitable for fluxless soldering or welding of aluminum or zinc comprising the steps of preparing a dry mixture of pulverized porous copper slag, finely divided charcoal and powdered sulphur, to said mixture adding muriatic acid in quantity sufficient to form a paste-like consistency, sufficiently heating up a major proportion by weight of zinc and a minor proportion by weight of lead together to bring them to the molten state, to the surface of said molten metals adding a quantity of finely divided charcoal, burning the charcoal by the ambient heat required to maintain the metals in the molten state, continuing said burning of the charcoal until the same is reduced to hardened red-heat layer capable of supporting the weight and mass of said muriatic acid paste mixture thereon, depositing and spreading a layer of said paste mixture on said hardened charcoal layer, forcing small areas of said paste layer through said hardened charcoal layer and into the molten metals bit by bit to generate a plurality of minute prolonged explosions and agitations within the molten metals, skimming off the flotation material forming at the surface when the agitation has subsided, and pouring the alloy into product molds for chilling and solidifying.

2. The process as defined by claim 1, wherein the process of producing an alloy suitable for fluxless soldering or welding of aluminum or zinc comprises by weight yellow brass 8%, aluminum 8%, 40–60 solder (40% tin and 60% lead) 1½%, and zinc 82½%.

References Cited in the file of this patent

UNITED STATES PATENTS

| | | |
|---|---|---|
| 324,505 | Walton | Aug. 18, 1885 |
| 1,097,926 | Koper | May 26, 1914 |
| 1,291,878 | Hess | Jan. 21, 1919 |
| 1,555,978 | Hunt | Oct. 6, 1925 |
| 1,891,546 | Krembs | Dec. 20, 1932 |
| 1,896,201 | Sterner-Rainer | Feb. 7, 1933 |
| 2,200,743 | Hardy | May 14, 1940 |